United States Patent
Borgia, Jr.

(10) Patent No.: US 6,412,376 B1
(45) Date of Patent: Jul. 2, 2002

(54) PVC PIPE END SMOOTH SURFACER

(76) Inventor: Joseph Borgia, Jr., 2723 Riverview Dr., Naples, FL (US) 34112

( * ) Notice: Subject to any disclaimer, the term of this patent is extended or adjusted under 35 U.S.C. 154(b) by 0 days.

(21) Appl. No.: 09/569,937

(22) Filed: May 12, 2000

(51) Int. Cl.$^7$ .................................................. B23B 5/16
(52) U.S. Cl. ............................ 82/113; 128/130; 128/131
(58) Field of Search ............................ 82/113, 128, 1.11, 82/46, 47, 130, 131, 173; 408/203.5, 204, 205, 206, 207, 231, 233, 80, 82, 83

(56) References Cited

U.S. PATENT DOCUMENTS

| | | | | |
|---|---|---|---|---|
| 3,875,831 A | * | 4/1975 | Beaulyoe | 82/113 |
| 5,197,362 A | * | 3/1993 | Birkestrand | 82/113 |
| 5,351,587 A | * | 10/1994 | Griffin | 82/113 |
| 5,711,197 A | * | 1/1998 | Ohmi et al. | 82/113 |
| 5,743,539 A | * | 4/1998 | VanderPol et al. | 279/58 |

* cited by examiner

Primary Examiner—Henry Tsai
(74) Attorney, Agent, or Firm—Merrill N. Johnson

(57) ABSTRACT

A PVC-pipe-end smooth-surfacer has a reamer cylinder (1) sized and shaped to fit slidably on an outside periphery of an external periphery of a PVC pipe (2) proximate a pipe end (12) to be cut with a cutting wheel (5) rotatable in a cylinder-base bearing (3) while a cutter shaft (4) on the cutter wheel is being rotated with a cutting element (15, 16) of the cutting wheel in cutting contact with the pipe end. A shaft keeper (14) on the cutter shaft assures limited travel of the cutter shaft through the cylinder-base bearing. An insertion spring (10) on the cutter shaft positions the cutting wheel in predetermined pressure against the pipe end. A reamer-cylinder base can have chip-removal apertures (13) for discharge of pipe-end cuttings. The reamer cylinder can have one or more internal graspers (23, 24) which can be used to center and to fix the reamer cylinder non-rotationally but removably on the external periphery of the PVC pipe. Low-friction bearings can be provided for rotation of the cutter shaft in the cylinder-base bearing. A drive coupling (6) on the cutter shaft can be structured for rotation by hand or motorized tooling. The PVC-pipe-end smooth-surfacer can be structured in sizes to cut PVC pipe ranging from about three-fourths-to-twelve-inches in diameter. A smooth-surfacing method is described.

13 Claims, 2 Drawing Sheets

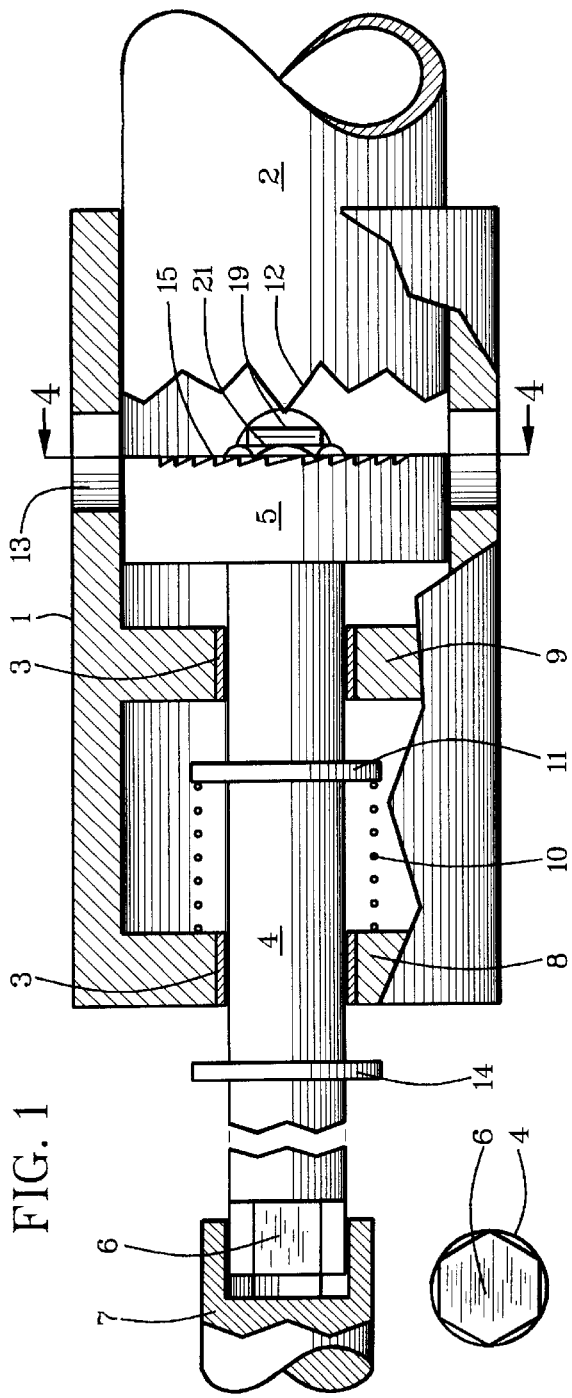
FIG. 1
FIG. 2
FIG. 3
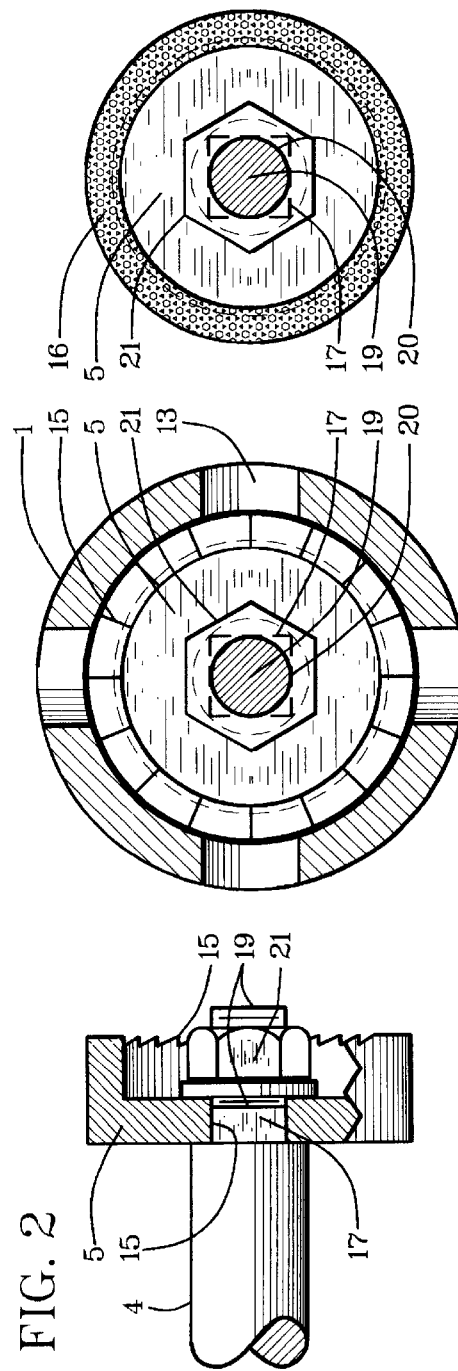
FIG. 4
FIG. 5

PVC PIPE END SMOOTH SURFACER

FIELD OF THE INVENTION

1. Field of the Invention

This invention relates to tools for underground, in-place and otherwise on-site cutting, grinding, honing and otherwise smooth-surfacing of broken or rough ends of PVC pipe for fitting such connectors as T-joints, end unions and angled couplings.

BACKGROUND OF THE INVENTION

2. Relation to Prior Art

There are known cutters, grinders and hones for finishing ends of metallic pipe, some of which can be used on PVC pipe, but none particularly for PVC pipe with the low weight, convenience and low cost of this invention.

Examples of a known related but different pipe-end cutters and grinders are described in the following patent documents. U.S. Pat. No. 4,952,103, issued to Bresin on Aug. 28, 1990, described a nozzle-tube resurfacing tool that was limited to having an end of an alignment bit inserted in the tube for alignment of a tube-end cutter. U.S. Pat. No. 4,934,109, issued to Allred on Jun. 19, 1990, described a pipe-end grinder support having a body portion with three legs extending to an internal periphery of a pipe. U.S. Pat. No. 4,620,823, issued to Hillestad on Nov. 4, 1986, described a portable tube-milling tool having a collet on a tapered shaft in a tube to hold it steady and prevent its rotation while being cut with an end-cutting tool. U.S. Pat. No. 3,870,429, issued to Lomax et al on Mar. 11, 1975, described a pipe-end trimming method limited to extending a cutting edge on a pilot from a cutting tool inside of a pipe while the cutting tool and the cutting edge on the pilot are being rotated to cut an end of the pipe with the cutting edge on the pilot. U.S. Pat. No. 3,142,139, issued to Mangum on Jul. 28, 1964, described an oil-well drill-collar-facing tool which was threaded tightly onto tapered threads of drill collar for anchoring an end-mill cutter to fine-cut an annular end of the drill collar precisely orthogonal to an axis of the tapered threads. U.S. Pat. No. 2,811,903, issued to Harmes on Nov. 5, 1957, described a facing tool having a frame mounted rigidly to an outside of a work piece having a cutting edge was rotated in the frame to cut a face of the work piece. U.S. Pat. No. 2,414,731, issued to Forbes, Jr. on Jan. 21, 1947, described an elongate hub positioned rigidly inside of a pipe with three legs tightened against an internal periphery of the pipe while a grinder on a radial extension from the hub was rotated in cutting contact with an annular end of the pipe.

SUMMARY OF THE INVENTION

Objects of patentable novelty and utility taught by this invention are to provide a PVC-pipe-end smooth-surfacer which can be used quickly, conveniently and inexpensively to cut and grind broken and jagged ends of PVC pipe for effective pipe fittings.

This invention accomplishes these and other objectives with a PVC-pipe-end smooth-surfacer having a reamer cylinder sized and shaped to fit slidably on an outside periphery of a PVC pipe proximate a pipe end to be cut with a cutting wheel rotatable in a cylinder-end bearing while a cutter shaft on the cutter wheel is being rotated with a cutting element of the cutting wheel in cutting contact with the pipe end. A shaft keeper on the cutter shaft assures limited travel of the cutter shaft through the cylinder-end bearing. An insertion spring on the cutter shaft positions the cutting wheel in predetermined pressure against the pipe end. A reamer-cylinder end can have chip-removal apertures for discharge of pipe-end cuttings. The reamer cylinder can have one or more internal graspers which center and fix the reamer cylinder non-rotationally and yet removably on the external periphery of the PVC pipe. Low-friction bearings can be provided for rotation of the cutter shaft in the cylinder-end bearing. The cutter shaft can be structured for rotation by hand or motorized tooling. The PVC-pipe-end smooth-surfacer can be structured in sizes to cut PVC pipe ranging from about three-fourths-to-twelve-inches in diameter.

BRIEF DESCRIPTION OF DRAWINGS

This invention is described by appended claims in relation to description of a preferred embodiment with reference to the following drawings which are explained briefly as follows:

FIG. 1 is a partially cutaway side view of an embodiment having a cutter wheel with cutter blades and a reamer cylinder with two bearings;

FIG. 2 is a drive-end view of a cutter shaft;

FIG. 3 is a partially cutaway side view of a cutter wheel attached to the cutter shaft with a rectangular attachment stem;

FIG. 4 is a section view through section line 4 in FIG. 1 from a pipe-fitting end of the reamer cylinder;

FIG. 5 is a cutter-end view of the cutter wheel with a grinding surface;

DESCRIPTION OF PREFERRED EMBODIMENT

Figure 6:
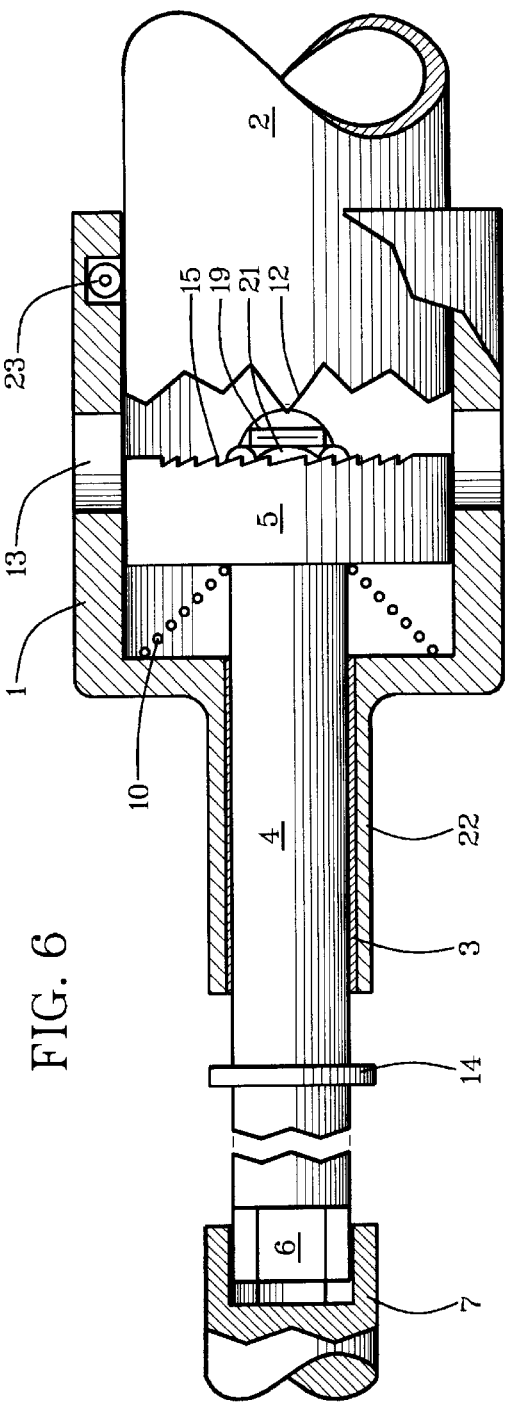
FIG. 6 is a partially cutaway side view of an embodiment having a linear pipe cutter in the reamer cylinder and a handle on the cylinder base of the reamer cylinder.

Listed numerically below with reference to the drawings are terms used to describe features of this invention. These terms and numbers assigned to them designate the same features throughout this description.

1. Reamer cylinder
2. PVC pipe
3. Cylinder bearing
4. Cutter shaft
5. Cutter wheel
6. Drive coupling
7. Rotational member
8. First cylinder wall
9. Second cylinder wall
10. Insertion spring
11. Spring shaft base
12. Pipe end
13. Chip-removal aperture
14. Shaft keeper
15. Cutter blade
16. Grinding member
17. Rectangular stem
18. Truncate-conical stem
19. Stem extension
20. Attachment aperture 21. Attachment nut
22. Handle
23. Disc blade
24. Friction ring Reference is made first to FIG. 1. A reamer cylinder 1 has an internal periphery of a pipe-fitting end that fits slidably on an outside periphery of a PVC pipe 2 to position the reamer cylinder 1 concentrically on the outside periphery of the PVC pipe 2. A cylinder base of the reamer cylinder has at least one cylinder bearing 3. A cutter shaft 4 is rotatable circumferentially and slidable linearly in the cylinder bearing 3 with the cutter shaft 4 being concentric to an axis of the reamer cylinder 1. A cutter wheel 5 is affixed to a cutter end of the cutter shaft 4 with a hub portion being orthogonal to an axis of the cutter shaft 4. A drive coupling 6, depicted also in FIG. 2, on a drive end of the cutter shaft 4 is sized and shaped to be rotated by a rotational member 7 that can be a hand wrench or a motorized rotator.

The cylinder base can have a first cylinder wall 8 and a second cylinder wall 9 proximate a drive end of the reamer cylinder 1 for containing two cylinder bearings 3 a predetermined distance apart for linear rigidity of the cutter shaft 4 and to provide a housing for an insertion spring 10.

The bearings 3 can be friction type that are preferably non-lubricated solids such as some high-temperature metal or metal coating and some plastic materials. Roller, pin or ball bearings can be used with appropriate sealing for special applications.

The insertion spring 10 has a spring base buttressed against the first cylinder wall 8 and a spring terminal buttressed against a spring shaft base 11 on the cutter shaft 4 intermediate the first cylinder wall 8 and the second cylinder wall 9 to spring-pressure the cutter shaft 4 for pressuring the cutter wheel 5 against a pipe end 12 of the PVC pipe 2 in the reamer cylinder 1. Optionally as shown in FIG. 6, the insertion spring can be buttressed intermediate an inside portion of the cylinder base and the cutter wheel 5.

One or more chip-removal apertures 13 in the reamer cylinder 1 can be provided for removing cuttings such as chips.

A shaft keeper 14 can be positioned on the cutter shaft 4 to prevent excessive linear travel of the cuter shaft 4 through the cylinder bearings 3.

The cutter wheel 5 has a cutting element such as cutter blades 15, depicted in FIGS. 1, 3–4 and 6–8, or a grinding member 16, depicted in FIG. 5, oriented a predetermined angle such as a ninety-degree angle from the cutter shaft 4 as shown.

Figure 7:
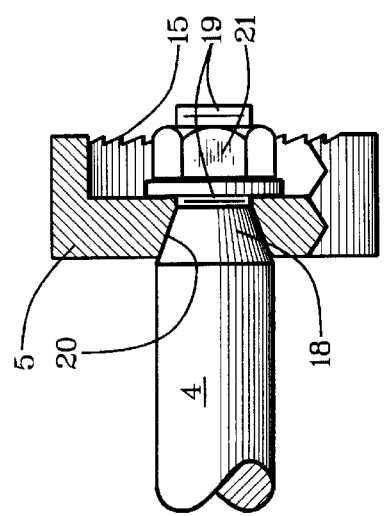
FIG. 7 is a partially cutaway side view of a cutter wheel attached to the cutter shaft with a truncate-conical attachment stem.

Referring to FIGS. 3–5 and 7, an attachment stem, such as a rectangular stem 17 shown in FIGS. 3–5 or a truncate conical stem 18 shown in FIG. 7, on the cutter end of the cutter shaft 4 has attachment threading on an outside periphery of a stem extension 19. The cutter wheel 5 has an attachment aperture 20 that is sized, shaped and positioned to receive the attachment stem. An attachment nut 21 having internal threading is threaded onto the attachment extension to hold the cutter wheel 5 on the cutter shaft 4.

Referring to FIG. 6, the reamer cylinder 1 can have a reamer holder such as a handle 22, wrench flats, or other holding device sized, shaped and positioned proximate an outside periphery of the cylinder base for particular sizes of reamer cylinders 1.

Figure 8:
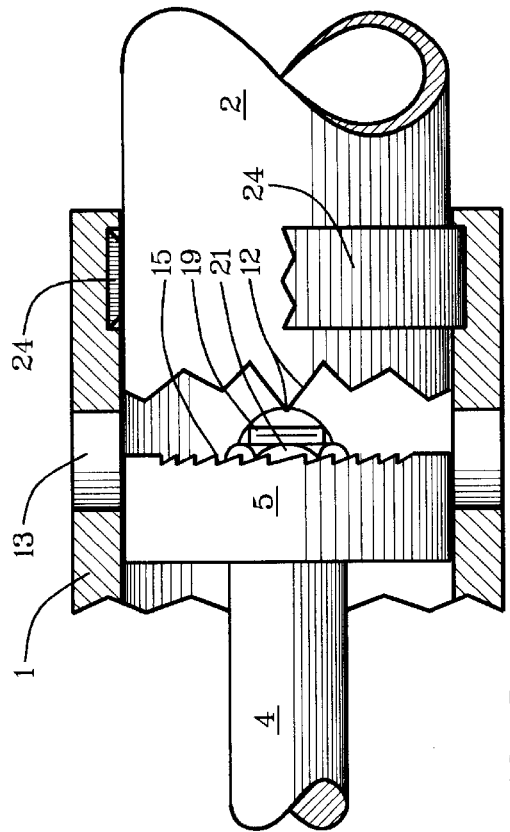
FIG. 8 is a partially cutaway side view of the pipe-fitting end of the reamer cylinder having an internal grasper that is a friction ring.

Referring to FIGS. 6 and 8, optional internal graspers such as a disc blade 23 for predetermined linear pipe cutting or a friction ring 24 in appropriate ring grooves in the internal periphery of the reamer cylinder 1 can be provided with internally directed pipe-grasping contact with an outside peripheral surface of the PVC pipe 2 to arrest its rotation in reaction to rotational contact of the cutter wheel 5. A rotation resister such as an adhesive can be positioned in the ring groove of the friction ring 24.

A method for smooth-surfacing a jagged end of a PVC pipe 2 includes first positioning a reamer cylinder 1 on an outside periphery of a PVC pipe 2 having a jagged pipe end 12 to be smoothed as desired. Honing level of smoothing also can be achieved with a sufficiently fine grinding member 16. Then a cutter wheel 5 on a cutter shaft 4 concentric to the reamer cylinder 1 and, therefore, predeterminedly concentric to the PVC pipe 2, is rotated while being pressured in cutting contact with the jagged pipe end 12. The cutter wheel 5 can include a cutter blade 15 for smooth-surfacing that is PVC cutting. Optionally and interchangeably, the cutter wheel 5 can include a grinding member 16 with suitable coarseness or finesse for smooth-surfacing that is PVC grinding.

The cutter wheel 5 has a cutting member such as the cutter blade 15 or the grinding member 16 that can be oriented a predetermined angle, such as the orthogonally ninety degrees depicted, for smooth-surfacing a predetermined facial angle on the jagged pipe end 12.

For some applications it is advantageous to arrest rotation of the PVC pipe 2 in reaction to rotation of the cutter wheel 5 while also arresting rotation of the reamer cylinder 1 with a cylinder holder such as the handle 22.

Cutting chips and cuttings generally from the jagged pipe end 12 can be removed by being allowed to escape through one or more chip-removal apertures 13 progressively while cutting or otherwise smooth-surfacing.

A new and useful PVC-pipe-end smooth-surfacer having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A PVC-pipe-end smooth-surfacer comprising:
   a reamer cylinder having an internal periphery of a pipe-fitting end that fits slidably on an outside periphery of a predetermined PVC pipe having a jagged end to position the reamer cylinder concentrically on the outside periphery of the PVC pipe;
   a cylinder base having a first cylinder wall proximate a drive end of the reamer cylinder and a second cylinder wall intermediate the drive end and the pipe fitting end of the reamer cylinder, each cylinder wall having a cylinder bearing;
   an insertion spring positioned intermediate the first cylinder wall and the second cylinder wall;
   a cutter and grinding shaft that is rotatable and slidable linearly in the cylinder bearings with the shaft being concentric to an axis of the reamer cylinder;
   in combination, a first cutter wheel selectively affixed to a cutter and grinding end of the shaft to cut jagged edges of the pipe and second smoothing surfacer wheel selectively affixed to the cutter and grinding end of the shaft to smooth the surface of the pipe;
   the first cutter wheel having a cutting element and the second smoothing surfacer wheel having a smoothing element both being oriented a predetermined angle from an axis of the cutter and grinding shaft; and
   a drive coupling on the drive end of the cutter and grinding shaft.

2. The PVC-pipe end smooth surfacer of claim 1 wherein:
the smoothing element is a grinding member having a grinding surface orthogonal to the shaft.

3. The PVC-pipe smooth-surfacer of claim 1 wherein:
the cutting element is a cutting blade having a cutting edge orthogonal to the shaft.

4. The PVC-pipe-end smooth-surfacer of claim 1 wherein:
the smoothing element is a grinding member having a grinding surface oriented a predetermined angle from the axis of the shaft.

5. The PVC-pipe-end smooth surfacer of claim 1 wherein:
the cutting element is a cutting blade having a cutting edge oriented a predetermined angle from the axis of the shaft.

6. The PVC-pipe-end smooth-surfacer of claim 1 wherein:
the insertion spring has a spring base buttressed against the first cylinder wall and a spring terminal buttressed a spring shaft base on the shaft intermediate the first cylinder wall and and the second cylinder wall to spring-pressure the shaft for pushing the cutter wheel or the smooth surfacer wheel against a pipe end in the reamer cylinder.

7. The PVC-pipe-end smooth-surfacer of claim 1 and further comprising:
at least one chip-removal aperature in the reamer cylinder proximate the cutter or smooth surfacer wheel.

8. The PVC-pipe-end smooth-surfacer of claim 1 and further comprising
at least one internal grasper having inwarly directed pipe grasping contact with an outside peripheral surface of the PVC pipe in the reamer cylinder.

9. The PVC-pipe-end smooth-surfacer of claim 8 wherein:
the internal grasper is a friction ring in a ring groove in the internal periphery of the reamer cylinder; and
a rotation resistor is positioned in the ring groove to arrest rotation of the friction ring and the PVC pipe in opposition to rotational cutting or grinding contact of the cutter or smooth surfacer wheel with the end of the PVC pipe.

10. The pipe-end smooth-surfacer of claim 8 wherein:
the at least one internal grasper is one or more linear pipe cutters or smooth surfacer having inward pressure from the inside periphery of the reamer cylinder for the predetermined cutting and grinding entry of one or more pipe cutters or smooth surfacers into the outside periphery of the PVC pipe to arrest rotation of the PVC pipe in opposition to rotational cutting and grinding contact of the cutter or or smooth surfacer wheel with the end of the PVC pipe.

11. The PVC-pipe-end smooth surfacer of claim 1 and further comprising:
an attachment stem of the grinding end of the shaft;
attachment threading on an outside periphery of a stem extension;
the attachment stem and the stem extension having axes that are concentric to an axis of the shaft;
an attachment aperture in the smoothing surfacer wheel;
the attachment aperture being sized, shaped and positioned to receive the attachment stem; and
an attachment nut having internal threading that threads onto the stem extension to hold the smooth surfacer wheel on the shaft.

12. The PVC-pipe-end hone of claim 11 wherein:
the attachment stem is a rectangular stem with a rectangular cross section; and
the attachment aperture has a rectangular cross section that is sized and shaped to slide onto the attachment stem.

13. The PVC-pipe-end smooth surfacer of claim 11 wherein:
the attachment stem is a truncate conical stem intermediate the grinding end of the shaft and the attachment threading; and
the attachment aperture has a truncate conical internal periphery that fits onto the attachment stem.

* * * * *